(12) United States Patent
Sparkes

(10) Patent No.: US 11,089,669 B2
(45) Date of Patent: Aug. 10, 2021

(54) ICP SPECTROSCOPY TORCH WITH REMOVABLE ONE-PIECE INJECTOR

(71) Applicant: Agilent Technologies, Inc., Santa Clara, CA (US)

(72) Inventor: Luke Sparkes, Mulgrave (AU)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 174 days.

(21) Appl. No.: 16/437,645

(22) Filed: Jun. 11, 2019

(65) Prior Publication Data

US 2019/0380194 A1    Dec. 12, 2019

Related U.S. Application Data

(60) Provisional application No. 62/683,685, filed on Jun. 12, 2018.

(51) Int. Cl.
  *B23K 10/00* (2006.01)
  *H05H 1/30* (2006.01)
  *G01N 21/73* (2006.01)

(52) U.S. Cl.
  CPC .............. *H05H 1/30* (2013.01); *G01N 21/73* (2013.01)

(58) Field of Classification Search
  CPC .. H05H 1/30; H05H 1/34; H05H 1/28; G01N 21/73
  USPC .............. 219/121.5, 121.51, 121.52, 121.48
  See application file for complete search history.

(56) References Cited

U.S. PATENT DOCUMENTS

| | | | |
|---|---|---|---|
| 5,186,621 A | 2/1993 | Pennington | |
| 6,621,199 B1 * | 9/2003 | Parfeniuk | H01J 61/30 118/723 R |
| 6,989,529 B2 | 1/2006 | Wiseman | |
| 7,847,210 B2 | 12/2010 | Brezni et al. | |
| 7,967,945 B2 * | 6/2011 | Glukhoy | H01J 37/321 156/345.48 |
| 8,614,542 B2 * | 12/2013 | Walker | C04B 35/111 313/143 |
| 10,834,807 B1 * | 11/2020 | Wiederin | H05H 1/26 |
| 2004/0140053 A1 | 7/2004 | Srivastava et al. | |
| 2007/0175871 A1 * | 8/2007 | Brezni | H05H 1/30 219/121.52 |

(Continued)

OTHER PUBLICATIONS

International Search Report and Written Opinion, PCT Application No. PCT/US19/36521, dated Aug. 29, 2019, 17 Pages.

(Continued)

*Primary Examiner* — Mark H Paschall
(74) *Attorney, Agent, or Firm* — Mannava & Kang, P.C.

(57) ABSTRACT

A torch for use in analytic instruments includes a tube subassembly with substantially cylindrical nested inner and outer tubes with coincident central axes, the inner tube having a terminus. The torch also includes a removable injector extending at least partially in the inner tube and having an alignment feature, an inlet, an outlet, and a central axis that is coincident with the central axes of the inner and outer tubes, a seal having a channel for accommodating a portion of the injector, and a base for supporting the tube subassembly, injector, and seal. The seal has a complementary feature to engage the alignment feature of the injector to prevent axial misalignment of the injector and maintain a fixed gap between the terminus of the inner tube and the outlet of the injector.

22 Claims, 9 Drawing Sheets

(56) References Cited

U.S. PATENT DOCUMENTS

| | | | |
|---|---|---|---|
| 2008/0035844 A1 | 2/2008 | Sakata et al. | |
| 2009/0059221 A1 | 3/2009 | Hammer | |
| 2014/0263202 A1 | 9/2014 | Partridge | |
| 2016/0165711 A1* | 6/2016 | Zhang .................... | H05H 1/34 |
| | | | 219/121.52 |

OTHER PUBLICATIONS

International Preliminary report on Patentability, PCT Application No. PCT/US19/36521, dated Dec. 15, 2020, 9 Pages.

* cited by examiner

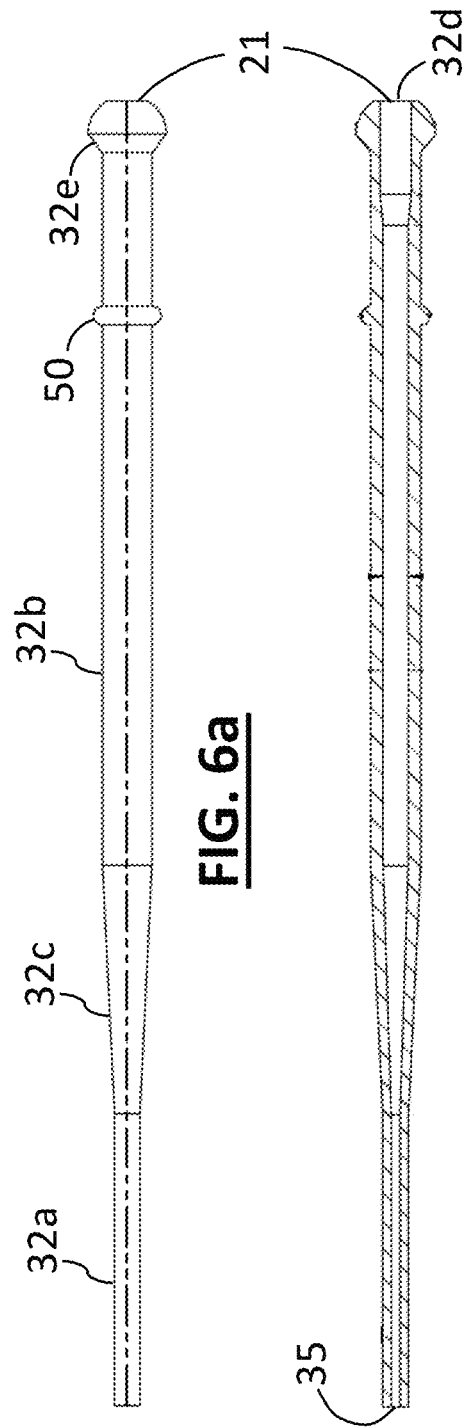

ICP SPECTROSCOPY TORCH WITH REMOVABLE ONE-PIECE INJECTOR

CROSS-REFERENCE TO RELATED APPLICATIONS

This application claims priority from U.S. Provisional Pat. App. No. 62/683,685, filed on Jun. 12, 2018, the contents of which are incorporated herein by reference in their entirety.

TECHNICAL FIELD

The present disclosure relates generally to torches used in analytical instruments.

BACKGROUND

Analytical instruments, such as those of the inductively coupled plasma (ICP) optical emission spectrometry (OES) type, use a torch to introduce a chemical element of interest into a controlled plasma for analysis of its spectral and other characteristics. A schematic diagram of such an ICP torch is show in FIG. 1. It consists of three concentric tubes, 10, 11 and 13, usually made out of fused quartz. Tube 13 is the outermost of the three tubes. Tube 11 is the intermediate tube and may be provided with a portion 12 of larger diameter, which may in some designs extend over the entire length of tube 11. The purpose of portion 12 is to provide a narrow annular gap between tubes 11 and 13 for the passage of a plasma forming gas (typically argon) that is supplied though a gas inlet 15. The narrow gap imparts a desirably high velocity to the gas. Radiofrequency induction coil 16 is supplied with radiofrequency current from a power supply (not shown). Plasma 17 is initiated by momentarily applying a high-voltage spark (by means known in the art and not shown) to the gas entering through gas inlet 15. Plasma 17 is sustained by inductive coupling of the radiofrequency electromagnetic field generated by coil 16 with the plasma. A small flow of gas is supplied to tube 11-12 through gas inlet 14. This serves to keep plasma 17 at an appropriate distance from the nearby ends 19 of tubes 11-12 and 10, so that the ends 19 of tubes 11-12 and 10 do not overheat.

For a microwave induced plasma instead of an inductively coupled plasma, the coil 16 would not be present and the torch 9 would be suitably associated with means for applying a microwave electromagnetic field to the torch. For example the torch 9 may be appropriately disposed in a resonant cavity to which microwave energy is supplied.

FIG. 1 shows a torch 9 in which the three tubes are permanently fused together, but it is known in the art to provide a mechanical arrangement whereby the three tubes 10, 11 and 13 are held in their required positions and wherein one or more of the tubes 10, 11 and 13 can be removed and replaced.

A flow of gas carrying sample aerosol (not shown) for analysis is introduced by known means (not shown) into the end of tube 10 remote from the plasma (i.e. the tube's inlet 33). Tube 10 is sometimes referred to as the injector. The aerosol-laden gas emerges from the other end (i.e. the outlet 35) of tube 10 adjacent to plasma 17 with sufficient velocity to pass through plasma 17. The passage through plasma 17 of gas and aerosol emerging from tube 10 forms a central channel 18 in plasma 17. Aerosol droplets passing from the outlet 35 of tube 10 into central channel 18 are progressively dried, melted, and vaporized by the heat of plasma 17. The vaporized sample is subsequently converted to atoms and ions by the heat of plasma 17, and these atoms and ions are excited to emit radiation by the heat of plasma 17. Radiation emitted by excited atoms and ions can be used for spectrochemical analysis by optical emission spectrometry, as is known in the art. Furthermore, ions in central channel 18 can be used for analysis by mass spectrometry, as is also known in the art.

In order that aerosol emerging from outlet 35 of tube 10 may effectively penetrate plasma 17 and form central channel 18, it is known to provide a narrow parallel-walled path through at least a portion of tube 10 adjacent to its outlet 35, so that the flow therethrough is substantially laminar. In FIG. 1, such a narrow parallel-walled path is shown extending the entire length of tube 10. It is also known, however, that such a long, narrow passage or capillary is readily obstructed by salts deposited from the aerosol when aerosols generated from samples containing high levels of dissolved solids are introduced into tube 10. Moreover, in practice, in order to couple the injector to the gas supply and position and align it in the torch assembly, some prior art torches use injectors that are inserted into a base that is then installed into the torch body. Such a torch arrangement is shown in FIG. 2, in which torch base 20 is used to retain injector 10 in torch body 24, consisting of two concentric quartz tubes 11, 13, whose proximal end portion 25 surrounds a portion of torch base 20. An O-ring 26 is accommodated in base 20 and surrounds injector 10. O-ring 26 is removable but is used for alignment and for providing a gas seal in some applications. Some drawbacks of prior art arrangements are that they can create a negative space and the potential for material to accumulate and lead to contamination carry-over effects. In addition to analytical effects, the injector is required to be mechanically inserted into the torch base 20 and the required injector 10 position manually set by the user. For these and other reasons, it is desirable to periodically disassemble the torch to clean and service its components, and the injector in particular. Following such maintenance, great care must be taken in reassembling the torch, and precise realignment of the injector and other components must be achieved. Improper and imprecise reassembly and realignment can lead to rapid degradation and melting of the torch and its components, and the instrument in which it is installed, and incorrect readings and analysis results.

OVERVIEW

Described herein is a torch including a tube subassembly having substantially cylindrical nested inner and outer tubes with coincident central axes, the inner tube having a terminus, a removable injector extending at least partially in the inner tube and having a bump, an inlet, an outlet, and a central axis that is coincident with the central axes of the inner and outer tubes, a seal having a channel for accommodating a portion of the injector, and a base for supporting the tube subassembly, injector, and seal. The seal has an internal groove for capturing the bump of the injector to prevent axial misalignment of the injector and maintain a fixed gap between the terminus of the inner tube and the outlet of the injector.

Also described herein is torch having a tube subassembly including a substantially cylindrical nested inner and outer tubes with coincident central axes, the inner tube having a terminus, a removable injector extending at least partially in the inner tube and having an inlet, an outlet, and a central axis that is coincident with the central axes of the inner and outer tubes, an adapter having a bump, a first channel for receiving the injector, an end stop for fixing the axial position of the injector in the first channel, a seal having a second channel for accommodating a portion of the injector, and a base for supporting the tube subassembly, adapter, and seal. The seal has an internal groove for capturing the bump of the adapter to prevent axial misalignment of the injector and maintain a fixed gap between the terminus of the inner tube and the outlet of the injector.

Also described herein is a torch including a tube subassembly including substantially cylindrical nested inner and outer tubes with coincident central axes, the inner tube having a terminus, a removable injector extending at least partially in the inner tube and having an alignment feature, an inlet, an outlet, and a central axis that is coincident with the central axes of the inner and outer tubes, a seal having a channel for accommodating a portion of the injector, and a base for supporting the tube subassembly, injector, and seal. The seal has a complementary feature to engage the alignment feature of the injector to prevent axial misalignment of the injector and maintain a fixed gap between the terminus of the inner tube and the outlet of the injector.

Some advantages of the described arrangement inure from maintaining the injector of the torch as a single piece, thereby eliminating the potential for sample to accumulate and lead to contamination, reducing the number of steps required for assembly and disassembly, and improving the ability to position and align the injector tip. One advantage is providing a single-piece injector that can be removed and cleaned as one piece. This reduces the required mating parts and thereby reduces the potential for leaking and contamination carry-over. Leaking in particular can be extremely hazardous due to some of the chemicals used in ICP spectroscopy. The described arrangement provides a fixed injector position in regards to tip height and side-to-side translation. The height control and safety retention features are incorporated directly onto the injector. In contrast, conventional solutions rely on the user pushing the injector all the way into the injector base. If this is not done correctly, due to user error or foreign objects that impede full insertion, the injector will be higher in the plasma and will fail very quickly. The arrangement described herein, by comparison, removes the risk of setting the injector position too high and destroying the injector/torch.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIGS. 6a and 6b are views of an injector in accordance with an embodiment;

DESCRIPTION OF EXAMPLE EMBODIMENTS

Example embodiments are described herein in the context of a torch used in analytical instruments such as those of the inductively coupled plasma (ICP) optical emission spectrometry (OES) type, although torches in other types analytical instruments can benefit from this design as well.

The following description is illustrative only and is not intended to be in any way limiting. Other embodiments will readily suggest themselves to those of ordinary skill in the art having the benefit of this disclosure. Reference will be made in detail to implementations of the example embodiments as illustrated in the accompanying drawings. The same reference indicators will be used to the extent possible throughout the drawings and the following description to refer to the same or like items.

In the description of example embodiments that follows, references to "one embodiment", "an embodiment", "an example embodiment", "certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The term "exemplary" when used herein means "serving as an example, instance or illustration." Any embodiment described herein as "exemplary" is not necessarily to be construed as preferred or advantageous over other embodiments.

In the interest of clarity, not all of the routine features of the implementations described herein are shown and described. It will be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
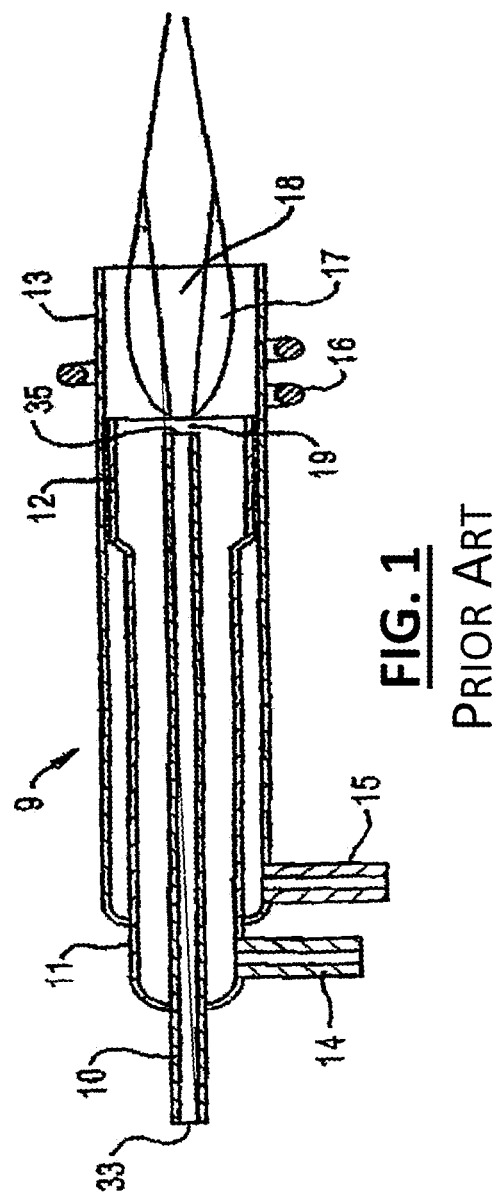
FIG. 1 is a side cross-sectional view of a torch in accordance with the prior art.
Figure 2:
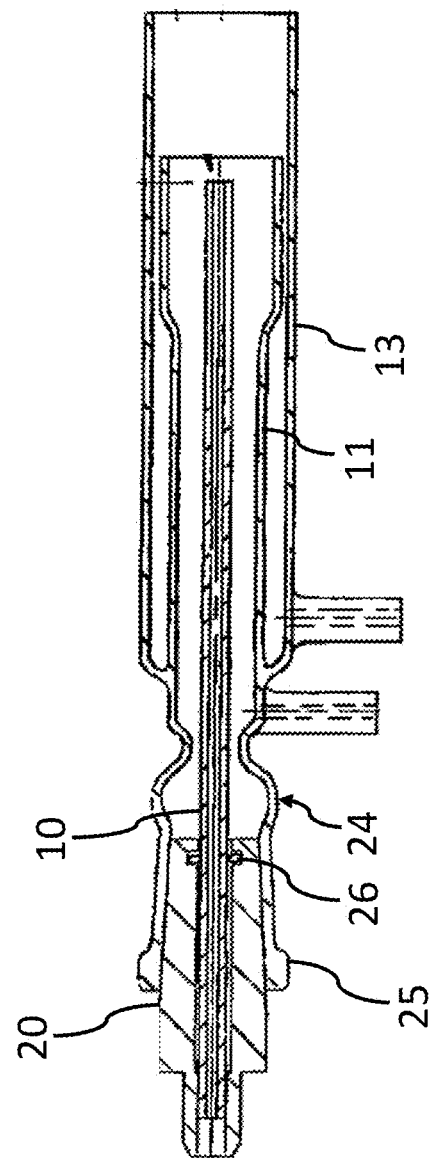
FIG. 2 is a side cross-sectional view of a torch in accordance with the prior art.
Figure 3:
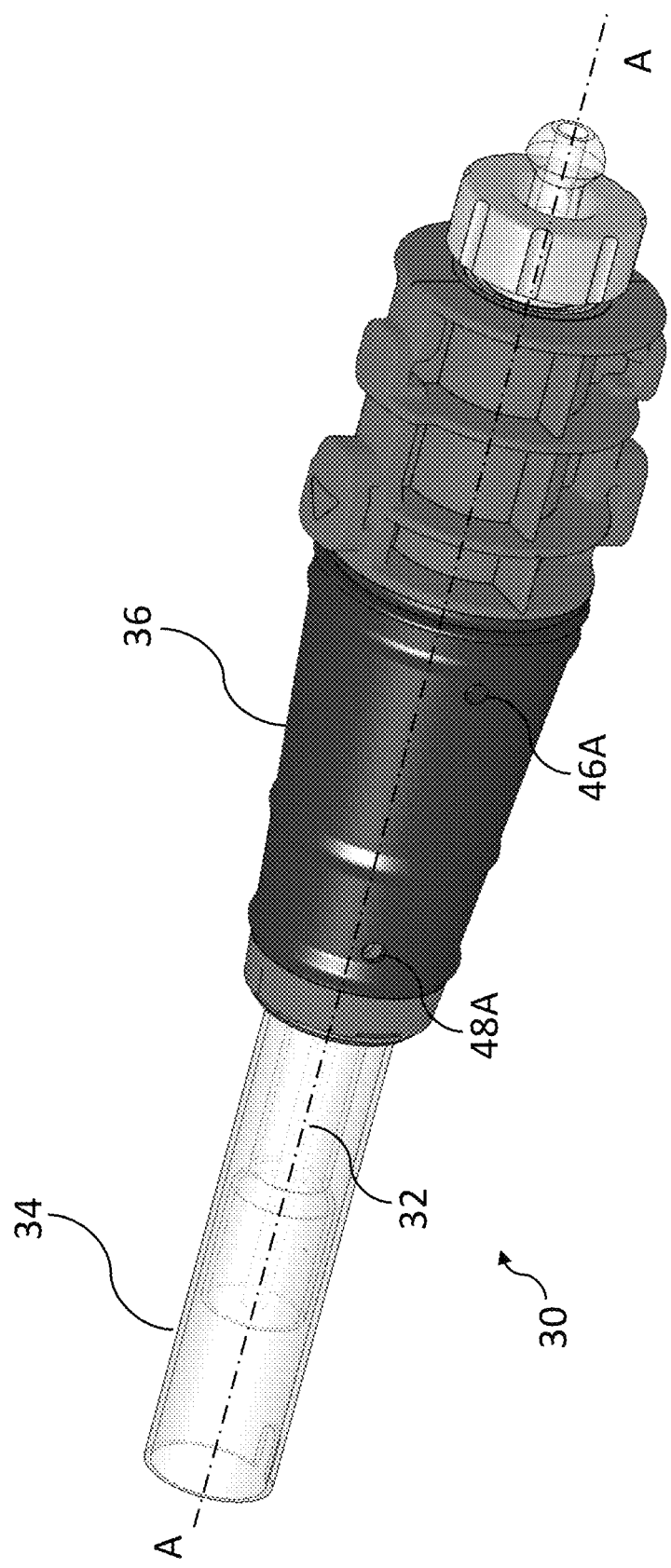
FIG. 3 is a perspective view of a torch in accordance with an embodiment.

FIG. 3 is a perspective view of a torch 30 suitable for use in analytical instruments such as those of the inductively coupled plasma (ICP) optical emission spectrometry (OES) type in one embodiment. Torch 30 generally comprises a removable one-piece injector 32, a tube subassembly 34, and a base 36. These components are arranged concentrically around central axis A.

Figure 4:
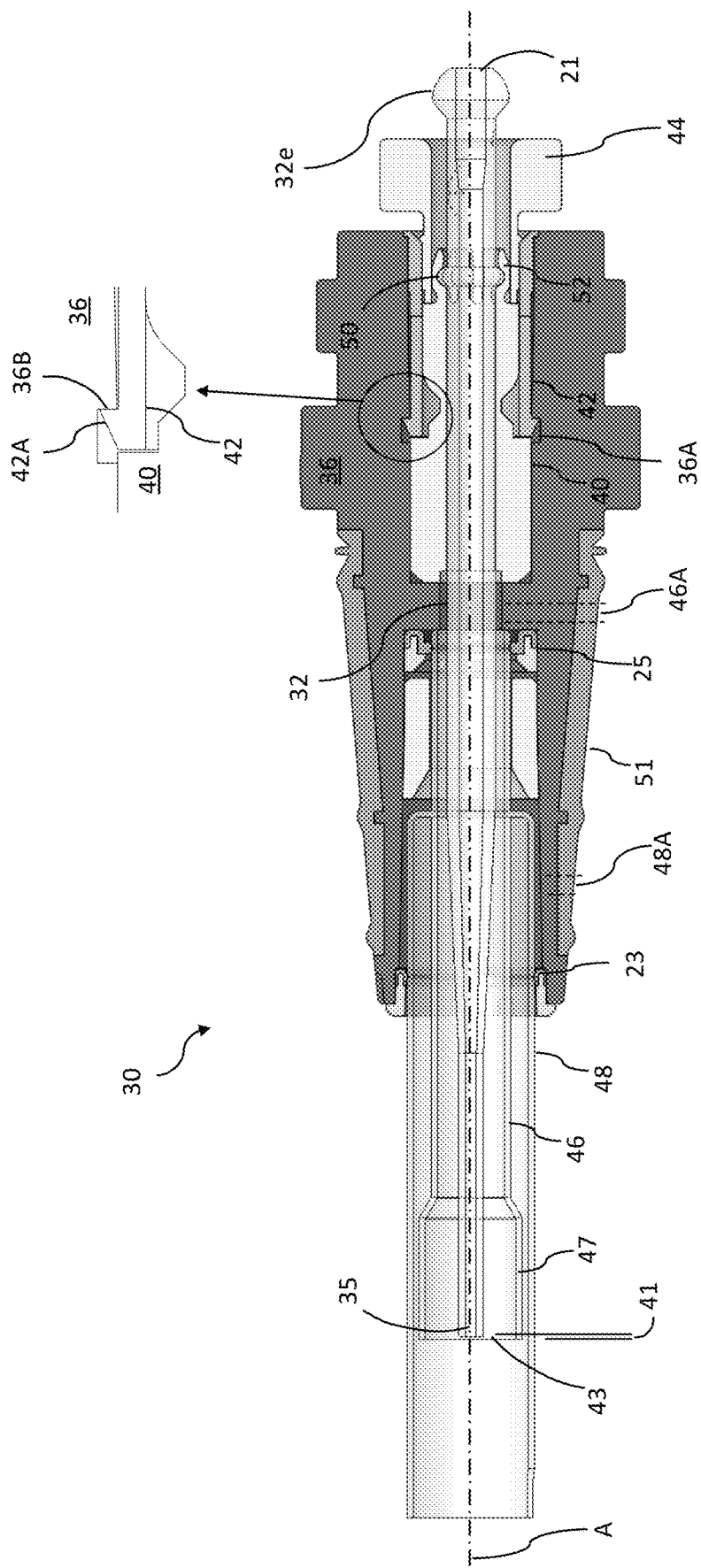
FIG. 4 is a side cross-sectional view of the torch of FIG. 3.

FIG. 4 is a side cross-sectional view of torch 30. Injector 32, which can be quartz, alumina, or ceramic, or other material depending on the particular application, is shown as having a hollow, generally elongated, tapered shape with a gas inlet 21 and a gas outlet 35. It is seated in seal 40 within base 36. Seal 40 is surrounded in part by an insert 42, which matingly threads at its proximal end with screw 44. In one embodiment, an overmold 51, which may be made of rubber, is provided to partially surround base 36. In one embodiment, base 36 may be of an injected molded plastic.

Figure 5A:
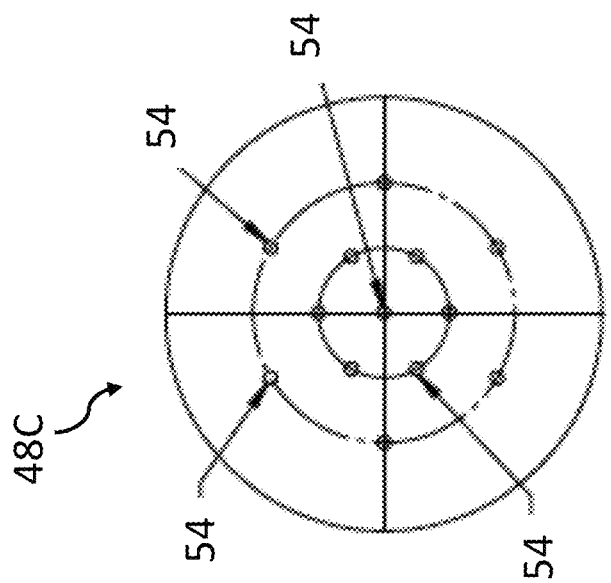
FIGS. 5 and 5a show side cross-sectional views of a tube subassembly in accordance with an embodiment.
Figure 5:
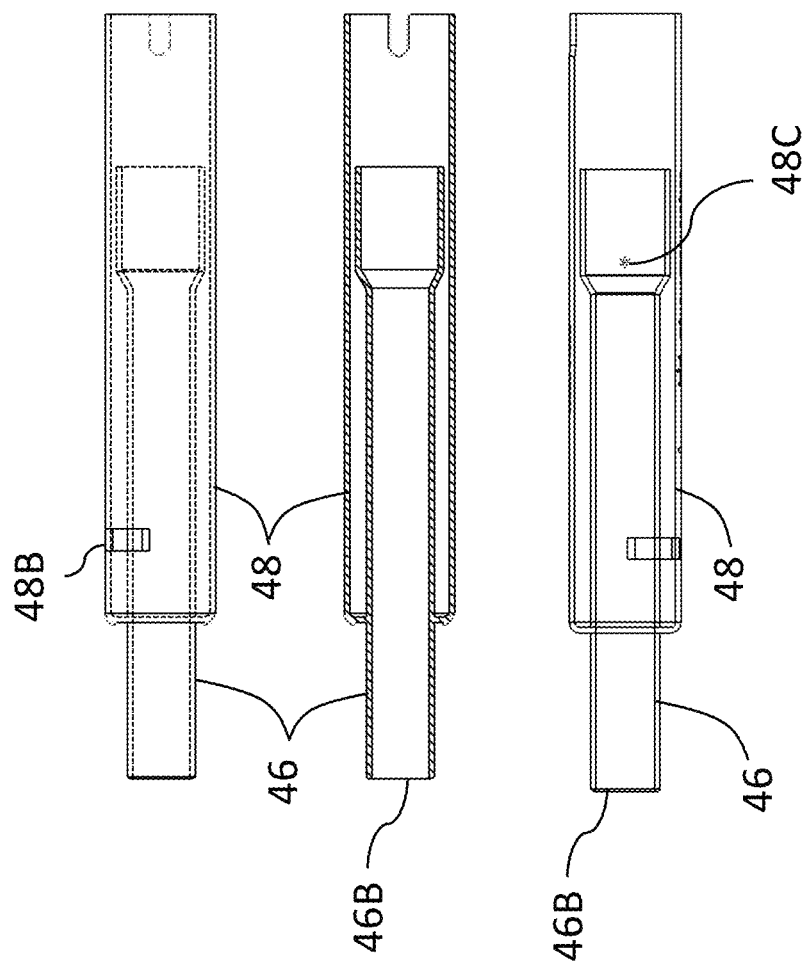

Concentrically surrounding a distal portion of injector 32 is tube subassembly 34, comprising inner tube 46 and outer tube 48, that in one embodiment are welded together with fixed axial alignment. In one embodiment, the material of tubes 46 and 48 is quartz. Moldings 23 and 25 provide a gas seal, and help position and retain the outer tube subassembly 34, which is held in place through friction interference. Inner tube 46 has an enlarged distal portion 47 that terminates at a small distance beyond gas outlet 35, said distance defined as a gap 41. Outer tube 48 terminates at a distance further beyond the terminus 43 of inner tube 46. As further detailed in FIG. 5, a first gas enters inner tube 46 by way of through-hole 46A (FIG. 4) in base 36 and tube opening 46B (FIG. 5). A second gas enters outer tube 48 by way of through-hole 48A (FIG. 4) in base 36, and side slot opening 48B (FIG. 5). Outer tube 48 has an orifice 48C penetrating through the outer tube wall to facilitate transmission of an ignition spark through the tube wall during operation. The orifice 48C is of a size that is small enough to restrict appreciable leakage of gas through the tube 48 wall, while permitting the passage of an ignition spark. The orifice 48C may take the form of one or more microscopic holes passing through the tube wall. These microscopic holes in certain embodiments may each be about 0.1 mm in diameter. Orifice 48C in the form of a pattern of multiple such microscopic holes 54 is shown in FIG. 5a.

FIGS. 6a and 6b are detailed views of injector 32, which comprises first and second portions 32a and 32b each having a generally constant outer diameter, conjoined by a taper portion 32c. The outer diameter of portion 32a is smaller than that of portion 32b. The interior of injector 32 defines a gas flow path whose shape substantially conforms to the exterior—that is, a substantially constant inner diameter at portion 32a that is smaller than a substantially constant inner diameter at portion 32b, with a joining taper at portion 32c. However, in one embodiment, the inner diameter in portion 32b may assume an expanding shape, to a larger constant inner diameter region 32d extending to the inlet 21. The taper at portion 32c in this example arrangement is used to reduce the effect of condensation and sample deposition. In one embodiment, inlet 21 may be provided with a ball joint 32e, to facilitate fitting to a sample inlet connection or tubing (not shown). In one embodiment, the injector material is quartz.

Injector 32 has an alignment feature, in this example an annular bump 50 formed integrally with the injector material and extending outwardly, for example at portion 32b. The bump 50 is captured in fingers 52 of seal 40 when portion 32b is seated in channel 39 of the seal, which is shown in greater detail in FIG. 7. Such capture, further detailed in FIG. 7a, enables precise alignment of single-piece injector 32 in seal 40, which, like quartz tubes 46 and 48, is fitted and aligned in position in base 36. Fingers 52 are flexible and define an internal groove 53 that receives bump 50 and retains it in place due to restriction of fingers 52 imparted by the internal bore of screw 44 when the screw is threaded into place in insert 42. Fingers 52 partially surround and curve around the bump 50 and prevent axial translation in either direction shown by two-headed arrow R in FIG. 7a. The precise alignment thus achieved axially fixes the location of outlet 35 of injector 32 relative to terminus 43 of inner tube 46, and ensures that gap 41 can be restored to its nominal size following disassembly and then reassembly of the torch 30, for example for cleaning or maintenance, with no further adjustment of the gap being necessary. In certain embodiments, disassembly simply entails removal of screw 44 and pulling out injector 32 from the torch 30. The tube subassembly 34 is also removable, independently of the injector 32. Moreover, in operation, the torch 30 is installed and retained vertically in the instrument with ball joint 32e exposed externally. A sample introduction spray chamber (nor shown) can be connected to the torch assembly 30 via the ball joint 32e. The secure capture of injector 32 in seal 40 as described above enables the torch 30 to support the weight of the spray chamber.

While the alignment feature is depicted as an integrally-formed bump 50 that in cross-section is semicircular, other shapes are contemplated, including other smaller circular or elliptical portions, or a straight or curved ramp shape, for instance. Further, the bump may not be integrally formed with the injector, but can instead be a separate component of the same or different material. In certain embodiments, a recess, rather than a bump, can be provided in the shaft of the injector, to engage a complementary feature, such as a bump provided in the fingers of the seal, to thereby similarly realize the retention and axial alignment of the injector.

Figure 7A:
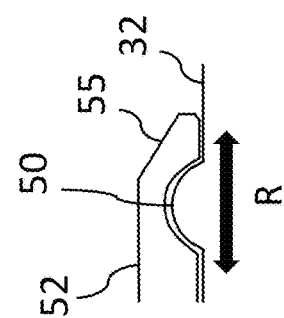
FIG. 7a is a schematic view showing the operation of the seal fingers and bump in preventing axial translation of the injector in accordance with an embodiment.
Figure 7:
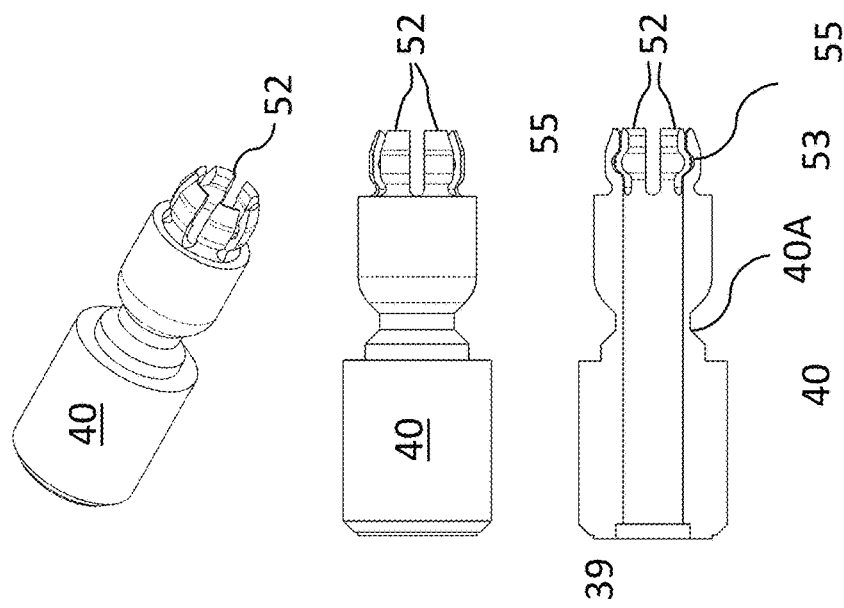
FIG. 7 shows different views of a seal in accordance with an embodiment.

As seen from FIGS. 7 and 7a, each of fingers 52 is provided with an inwardly (toward central axis A) tapered end portion 55. This taper facilitates the passage of the leading edge 43 of screw 44 along and over fingers 52 as the screw is inserted into insert 42 and threaded into the insert. When screw 44 is inserted into insert 42 and tightened, the leading edge 43 of the screw impacts and compresses seal 40. The compression force causes a recessed portion 40A in the seal to collapse around the injector shaft portion 32b and thereby establish a gas seal. It will be appreciated that while the applied force that displaces fingers 52 inwardly and compresses seal 40 in this example is provided by screw 44, other mechanisms in lieu of a screw are contemplated, such as a bayonet fitting. In one embodiment, seal 40, like its fingers 52, is made of PTFE (polytetrafluoroethylene) or similar material to provide the necessary flexibility. At the same time, seal 40 is of sufficient rigidity to ensure that injector 30 is concentric with quartz tubes 46 and 48 and the central axes of these components remain substantially coincident.

Figure 8:
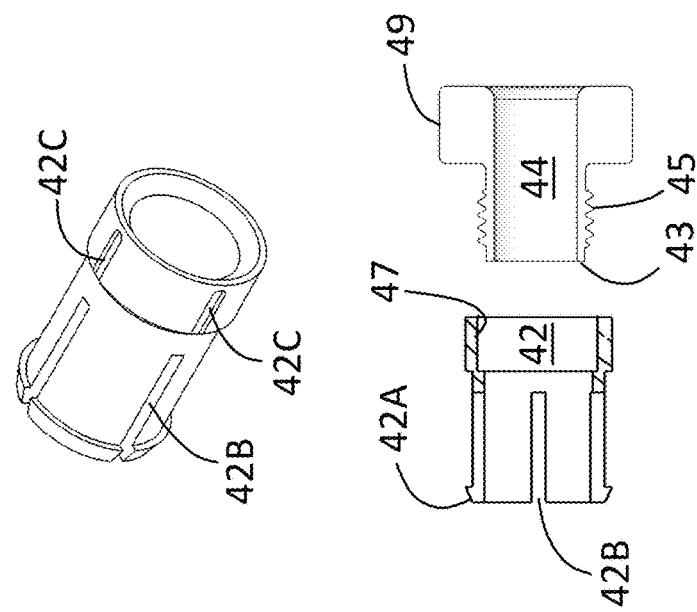
FIG. 8 shows different views of an insert and screw in accordance with an embodiment.

Screw 44, shown in greater detail in FIG. 8, has external threads 45 which engage internal threaded portion 47 of insert 42. In certain embodiments, it can be provided with an oval profile, and/or a textured or knurled surface 49, to improve grip by the operator when threading it into place in insert 42. In one embodiment, it is made of polypropylene, and is of sufficient rigidity to maintain, in cooperation with insert 42, the compression force exerted on seal 40.

Insert 42 has an annular barb 42A that when assembled into base 36 engages into annular recess 36A, engaging against shoulder 36B (FIG. 4) to lock the insert into position in the base. This enables fixed retention of insert 42 and seal 40 within base 36. Barb 42A also transmits the reaction force from screw 44 compressing seal 40, via the insert 42 into base 36. Insert 42 has a number of keyways 42C that interface with raised key features (not shown) in base 36. This interaction prevents rotation of the insert 42 once installed into base 36 and translates any rotational torque generated by the insertion of screw 44 into base 36. One or more slots 42B may be provided in the insert to relieve pressure, for example caused by inward force from the barb 42A during initial assembly. In one embodiment, insert 42 is made of PEEK (polyether ether ketone), and is of sufficient strength to enable permanent retention with base 36 with the compression of seal 40.

Figure 9:
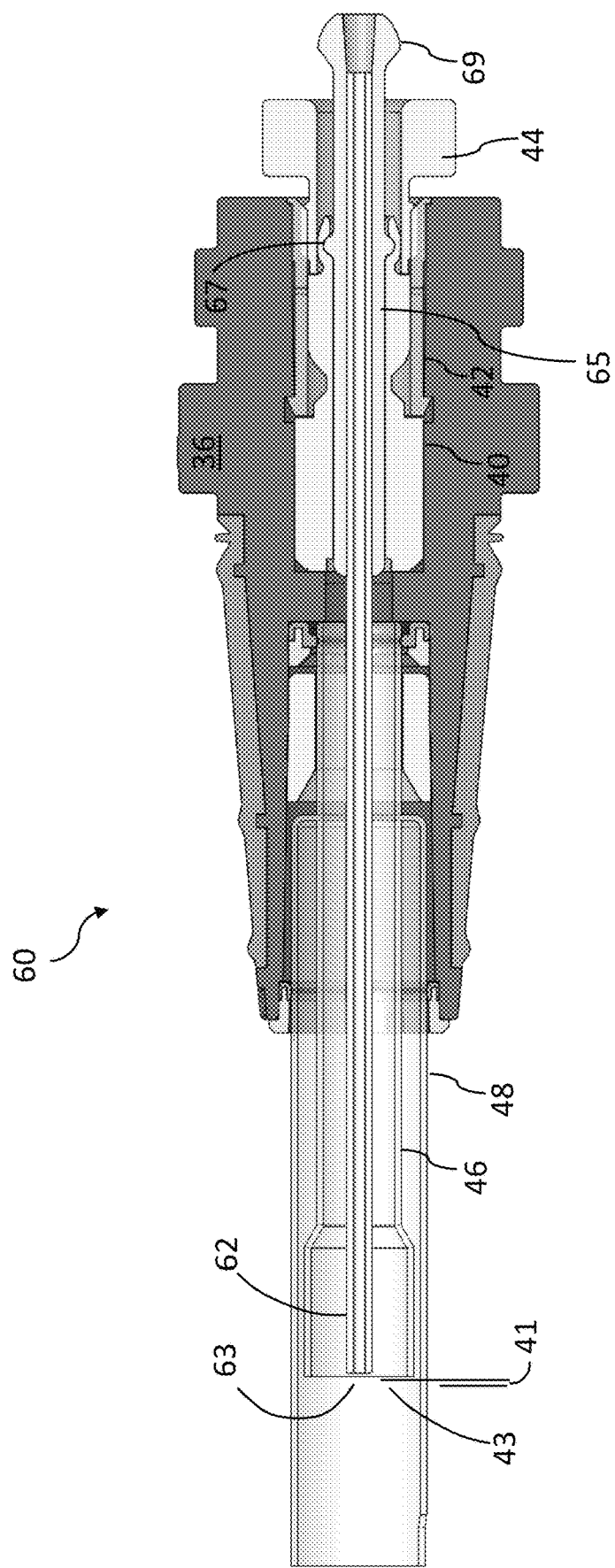
FIG. 9 is a side cross-sectional view of a torch in accordance with an embodiment.

FIG. 9 is a side cross-sectional view of torch 60 in accordance with one embodiment. It includes an injector 62, which can be quartz or ceramic, or other material depending on the particular application, and has a hollow, generally cylindrical shape with a gas inlet 61 and a gas outlet 63. Injector 62 is seated in adapter 65, which in turn is seated in seal 40 within base 36. Details of torch 60 are as substantially as explained above with respect to torch 30, except that a different injector (62) requiring adapter 65 is used in torch 60.

Figure 10:
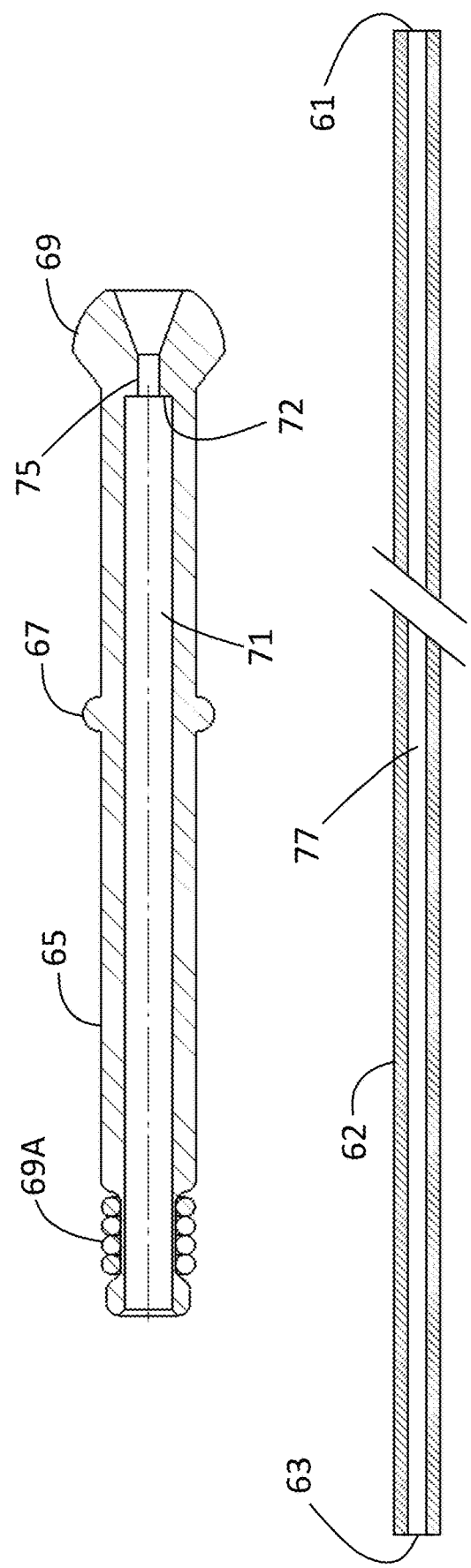
FIG. 10 is shows side cross-sectional views of an adapter and injector in accordance with an embodiment.
Figure 10A:
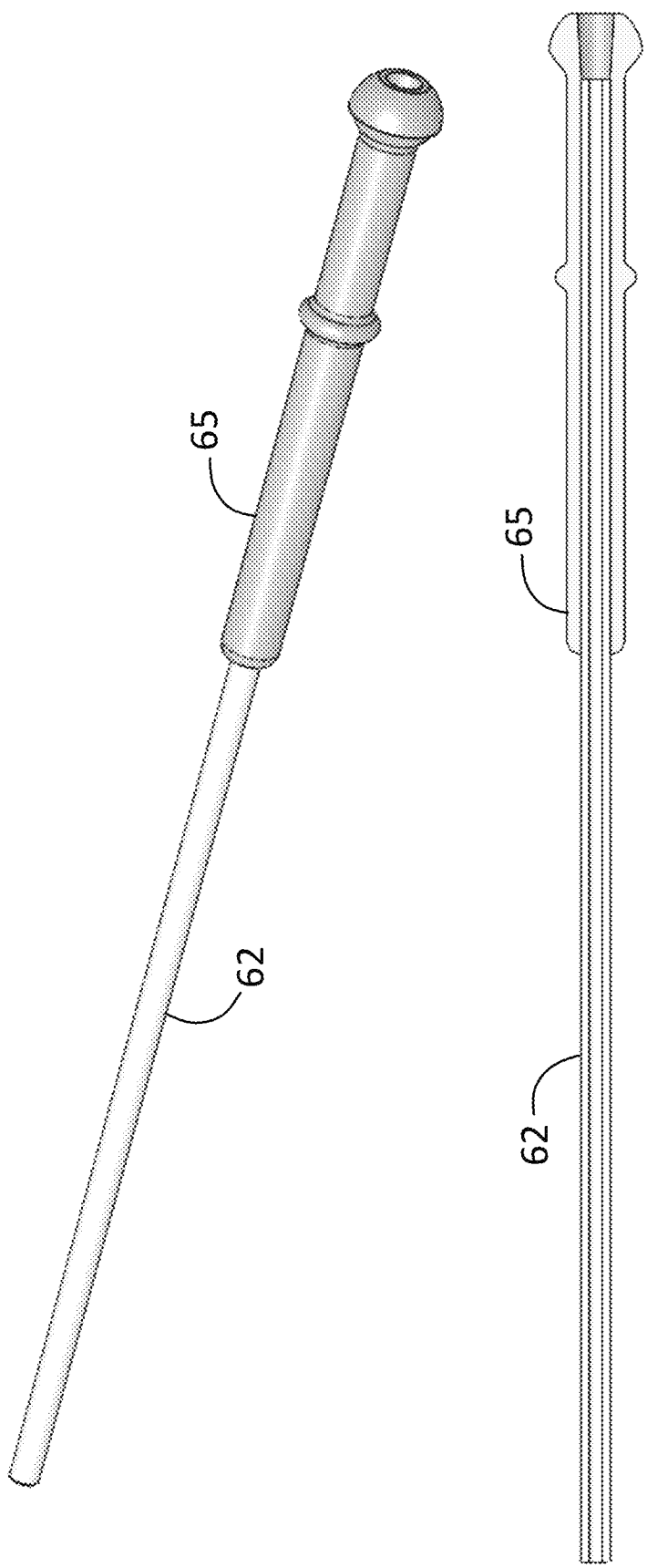
FIG. 10A is an embodiment in which the injector is interference fit in the adapter and O-rings are eliminated.

Injector 62 and adapter 65 are shown in greater detail in FIG. 10. Adapter 65 has an alignment feature in the form an annular bump 67 formed integrally with the adapter material, and a ball joint 69. A channel 71 is provided for accommodating injector 62 therein. The channel optionally has an end stop 72 against which the injector rests, fixing its position axially within the adapter. Thus end stop 72, together with bump 67, ensure axial alignment of the injector 62 and control of gap 41 to the desired size as described above. In certain embodiments, injector 62 is physically pressed into the adaptor 65 with an interference fit that prevents the injector from moving, optionally eliminating the need for the end stop 72. Such an arrangement is shown in FIG. 10A.

A flow path 75 communicates with the interior 77 of injector 62 at inlet 61. Concentric O-rings 69A around the adaptor provide reduction in diameter of channel 71 that facilitates a gas seal radially around injector 62 when installed. In certain embodiments, the O-rings can be eliminated, with the sealing being accomplished by an interference fit of the materials, as seen in FIG. 10. In one embodiment, the cylindrical, untapered shape and the alumina composition of injector 62 make it particularly useful as an inert injector of samples containing hydrofluoric acid. In one embodiment, the material of adapter 65 is PTFE, which also provides chemical resistance to samples containing hydrofluoric acid.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted based on the foregoing description.

What is claimed is:

1. A torch comprising:
   a tube subassembly including substantially cylindrical nested inner and outer tubes with coincident central axes, the inner tube having a terminus;
   a removable injector extending at least partially in the inner tube and having a bump, an inlet, an outlet, and a central axis that is coincident with the central axes of the inner and outer tubes;
   a seal having a channel for accommodating a portion of the injector; and
   a base for supporting the tube subassembly, the injector, and the seal,
   wherein the seal has an internal groove and resiliently captures, at the internal groove, the bump of the injector to prevent axial misalignment of the injector and maintain a fixed gap between the terminus of the inner tube and the outlet of the injector.

2. The torch of claim 1, wherein the seal has a plurality of flexible fingers defining the internal groove.

3. The torch of claim 2, further comprising:
   a screw for restricting movement of the flexible fingers and thereby prevent motion of the injector bump and retain the injector within the base.

4. The torch of claim 3, wherein the fingers have inwardly-sloped end portions to facilitate passage of the screw thereover.

5. The torch of claim 3, further comprising:
   an insert disposed in the base and having threads for mating with threads of the screw and barbs for retention within the base.

6. The torch of claim 1, wherein the injector has a tapered shape in a direction of the outlet.

7. The torch of claim 1, wherein the material of the injector is quartz.

8. The torch of claim 1, wherein the outer tube includes an orifice for transmission of an ignition spark through the outer tube.

9. The torch of claim 8, wherein the orifice is a pattern of multiple microscopic holes.

10. A torch comprising:
    a tube subassembly including nested inner and outer tubes;
    a removable injector extending at least partially in the inner tube;
    an adapter having a bump and a first channel for receiving the injector; and
    a seal having a second channel for accommodating a portion of the injector;
    wherein the seal has an internal groove and resiliently captures, at the internal groove, the bump of the adapter.

11. The torch of claim 10, wherein the seal has a plurality of flexible fingers defining the internal groove.

12. The torch of claim 11, further comprising:
    a screw for restricting movement of the flexible fingers.

13. The torch of claim 11, wherein the fingers have inwardly-sloped end portions.

14. The torch of claim 12, further comprising:
    an insert disposed in a base for supporting the tube subassembly and having threads for mating with threads of the screw.

15. The torch of claim 10, wherein the injector has a substantially cylindrical shape.

16. The torch of claim 10, wherein the material of the injector is alumina.

17. The torch of claim 10, further comprising:
    one or more O-rings around the adapter to provide radial compression.

18. The torch of claim 10, wherein the outer tube includes an orifice for transmission of an ignition spark through the outer tube.

19. The torch of claim 10, wherein the adapter includes an end stop for fixing an axial position of the injector in the first channel.

20. A torch comprising:
    an injector including an alignment feature; and
    a seal including at least one flexible finger to resiliently capture the alignment feature of the injector.

21. The torch of claim 20, wherein the alignment feature is a bump.

22. The torch of claim 20, wherein the at least one flexible finger includes a complementary feature to resiliently capture, at the complementary feature, the alignment feature of the injector.

* * * * *